(12) United States Patent
Jiang et al.

(10) Patent No.: US 8,617,401 B2
(45) Date of Patent: Dec. 31, 2013

(54) APPARATUS AND METHOD FOR OPTIMIZING WATER PURIFICATION PROFILE

(75) Inventors: Dingshan Jiang, Shenzhen (CN); Kai Zhao, Shenzhen (CN)

(73) Assignee: Shenzhen Inike Electrical Appliances Co., Ltd., Shenzhen (CN)

( * ) Notice: Subject to any disclaimer, the term of this patent is extended or adjusted under 35 U.S.C. 154(b) by 528 days.

(21) Appl. No.: 12/559,566

(22) Filed: Sep. 15, 2009

(65) Prior Publication Data

US 2010/0230364 A1  Sep. 16, 2010

(30) Foreign Application Priority Data

Mar. 30, 2009 (CN) .......................... 2009 1 0106251

(51) Int. Cl.
  *C02F 1/00* (2006.01)
  *G05B 13/00* (2006.01)

(52) U.S. Cl.
  USPC ............................. 210/742; 210/652; 700/271

(58) Field of Classification Search
  USPC ........................ 210/742, 149, 652; 700/271
  See application file for complete search history.

(56) References Cited

U.S. PATENT DOCUMENTS

| 4,983,301 A * | 1/1991 | Szucz et al. ................... 210/636 |
| 6,139,724 A * | 10/2000 | Strohm et al. .................. 210/85 |
| 6,508,937 B1 * | 1/2003 | Kawashima et al. ......... 210/652 |
| 2008/0023410 A1 * | 1/2008 | Efraty ........................... 210/741 |

OTHER PUBLICATIONS

"Terms and Equations of Reverse Osmosis", Jan. 23, 2001, Hydranautics, pp. 1-5 downloaded from http://www.membranes.com/docs/trc/termsequ.pdf.*

* cited by examiner

*Primary Examiner* — Duane Smith
*Assistant Examiner* — Paul J Durand
(74) *Attorney, Agent, or Firm* — Matthias Scholl P.C.; Matthias Scholl

(57) ABSTRACT

An apparatus for optimizing water purification profile, has a front processing unit, a booster pump having a water inlet, a rear processing unit, a waterflow control unit, an emission control unit, a control circuit, and a temperature sensing probe. The front processing unit is connected to the water inlet via a pipe. The control circuit corresponds to the emission control unit. The temperature sensing probe senses water temperature. The control circuit is connected to the temperature sensing probe whereby automatically adjusting time of producing purified water in a periodic cycle. The apparatus implements a constant water utilization rate as water temperature changes.

7 Claims, 2 Drawing Sheets

APPARATUS AND METHOD FOR OPTIMIZING WATER PURIFICATION PROFILE

CROSS-REFERENCE TO RELATED APPLICATIONS

Pursuant to 35 U.S.C. §119 and the Paris Convention Treaty, this application claims the benefit of Chinese Patent Application No. 200910106251.7 filed on Mar. 30, 2009, the contents of which are incorporated herein by reference.

BACKGROUND OF THE INVENTION

1. Field of the Invention

The invention relates to an apparatus and a method, and more particularly to an apparatus and a method for optimizing water purification profile.

2. Description of the Related Art

Water purifiers are widely used nowadays. FIG. 1 illustrates operation principle of an apparatus for optimizing water purification profile in the prior art. Raw water is processed by a reverse osmosis membrane, and impurities such as suspended substance, microorganisms, organic compounds, heavy metals, soluble solids and so on are filtered thereby. During this process, a large amount of water is used to wash the surface of the reverse osmosis membrane whereby removing the impurities, and is referred to as concentrated water.

A water utilization rate is a key technical parameter of an apparatus for optimizing water purification profile, and is obtained according the following formula: water utilization rate=production capacity of purified water/(production capacity of purified water+emission of concentrated water)

A problem with the existing apparatus for optimizing water purification profile is, as temperature decreases, the production capacity of purified water decreases, and therefore the water utilization water correspondingly decreases.

SUMMARY OF THE INVENTION

In view of the above-described problem, it is one objective of the invention to provide an apparatus for optimizing water purification profile that features a stable water utilization rate as water temperature changes.

It is another objective of the invention to provide a method for optimizing water purification profile that features a stable water utilization rate as water temperature changes.

To achieve the above objectives, in accordance with one embodiment of the invention, provided is an apparatus for optimizing water purification profile, comprising a front processing unit, a booster pump having a water inlet, a rear processing unit, a waterflow control unit, an emission control unit, a control circuit, and a temperature sensing probe, wherein the front processing unit is connected to the water inlet via a pipe, the control circuit communicates with the emission control unit, the temperature sensing probe senses water temperature, and the control circuit is connected to the temperature sensing probe whereby automatically adjusting time of producing purified water in a periodic cycle.

In a class of this embodiment, the booster pump comprises a water inlet.

In a class of this embodiment, concentrated water in the apparatus for optimizing water purification profile returns to the water inlet of the booster pump via the waterflow control unit in a circulation manner, whereby facilitating time-controllable recycling and reusing, and periodic emission at a preset time.

In a class of this embodiment, the control circuit implements time-controllable recycling and reusing and periodic emission at a preset time.

In a class of this embodiment, the temperature sensing probe is disposed in the pipe.

In a class of this embodiment, the temperature sensing probe is disposed in the front processing unit.

In a class of this embodiment, the temperature sensing probe is disposed in the booster pump.

In a class of this embodiment, the temperature sensing probe is disposed in the rear processing unit.

In a class of this embodiment, the temperature sensing probe is disposed in the emission control unit.

In a class of this embodiment, the control circuit comprises a microprocessor operating to execute temperature control programs.

In accordance with another embodiment of the invention, provided is a method for optimizing water purification profile, comprising providing an emission control device and a temperature sensing probe, controlling the emission control device to operate according to a standard emission time for purified water set at a water temperature of 25° C., obtaining an actual water temperature and performing temperature compensation thereof based on the water temperature of 25° C., and modifying an emission time of purified water based on a result of the temperature compensation and controlling the emission control unit to operate.

In a class of this embodiment, the step of modifying an emission time of purified water based on a result of the temperature compensation and controlling the emission control unit to operate comprises automatically reducing time of producing purified water if an inlet water temperature rises.

In a class of this embodiment, the step of modifying an emission time of purified water based on a result of the temperature compensation and controlling the emission control unit to operate comprises automatically increasing time of producing purified water if an inlet water temperature decreases.

An Advantage of the invention is that by compensating for influence of temperature on the production capacity of purified water, the water utilization rate is constant.

BRIEF DESCRIPTION OF THE DRAWINGS

The invention is described hereinafter with reference to accompanying drawings, in which.

DETAILED DESCRIPTION OF THE EMBODIMENTS

Figure 1:
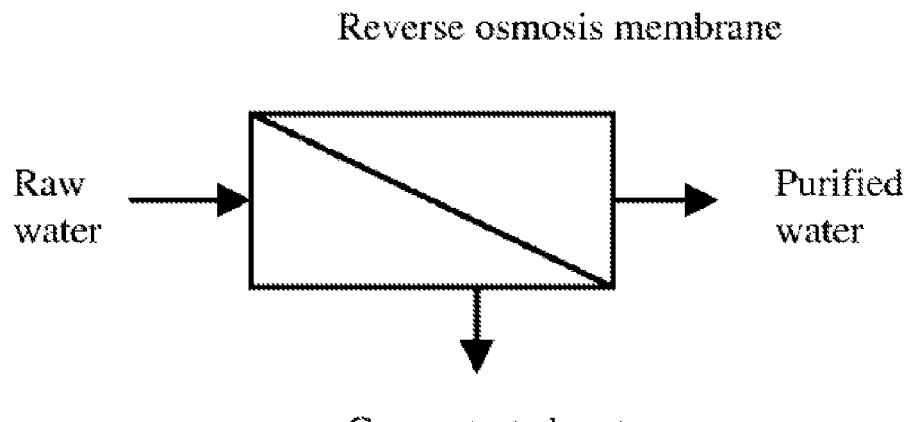
FIG. 1 illustrates operation principle of an apparatus for optimizing water purification profile in the prior art.
Figure 2:
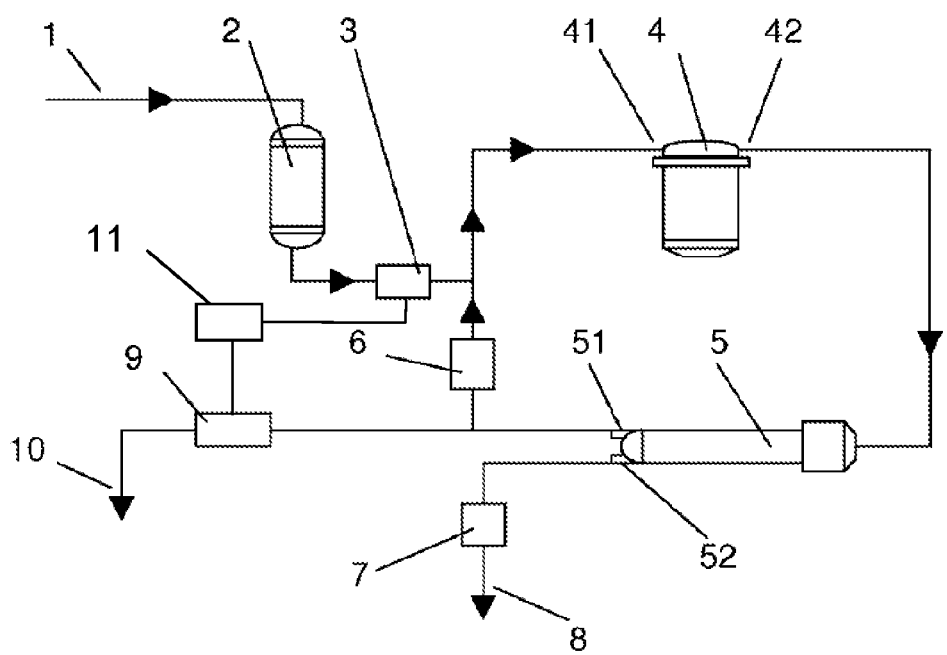
FIG. 2 is a schematic view of an apparatus for optimizing water purification profile of an exemplary embodiment of the invention.
Figure 3:
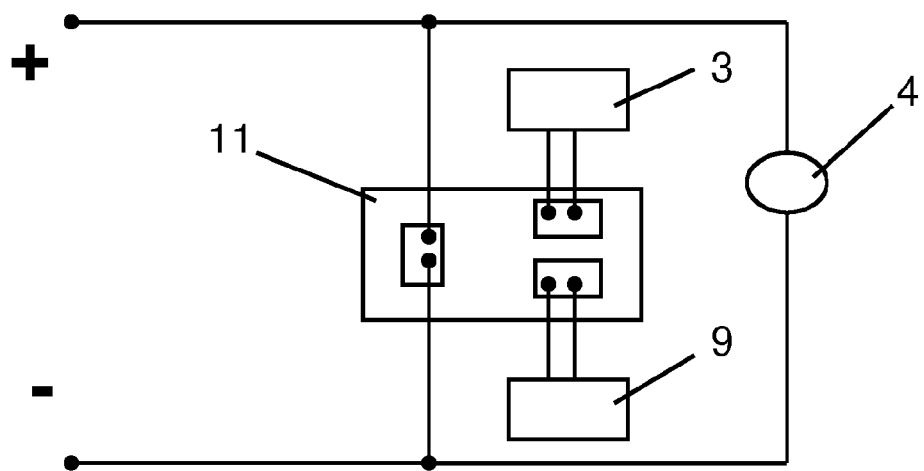
FIG. 3 is a schematic diagram of an apparatus for optimizing water purification profile of an exemplary embodiment of the invention.

As shown in FIG. 2, an apparatus for optimizing water purification profile of the invention comprises a front processing unit 2, a temperature sensing probe 3, a booster pump 4 having a water inlet 41 and a water outlet 42, a reverse osmosis membrane 5 having a first water outlet 51 and a second water outlet 52, a waterflow control unit 6, a rear processing unit 7, a purified water outlet 8, an emission control unit 9, a concentrated water outlet 10, and a control circuit 11.

The front processing unit 2 is connected to the water inlet 1 via a pipe.

Purified water is emitted from the water outlet 8.

Concentrated water from the second water outlet 52 is divided into two streams, one passing the waterflow control unit 6 and the water inlet 41 of the booster pump 4 and entering the reverse osmosis membrane 5 whereby forming a circulating flow, the other one passing the emission control unit 9 and being emitted from the concentrated water outlet 10.

The waterflow control unit 6 operates to control water to flow in only one direction that is from the first water outlet 51 of the reverse osmosis membrane 5 to the water inlet 41 of the booster pump 4, and to maintain stable pressure of the circulating flow by controlling water flow.

The temperature sensing probe 3 is electrically connected to the control circuit 11, and operates to transmit a water temperature signal thereto.

The control circuit 11 is electrically connected to the emission control unit 9, and operates to transmit a concentrated water discharging signal thereto.

The temperature sensing probe 3 can be disposed in the pipe, the front processing unit 2, the booster pump 4, rear processing unit 7, or the emission control unit 9.

Operation principle of the apparatus for optimizing water purification profile is as follows:

Raw water flows through the water inlet 1, the front processing unit 2, the temperature sensing probe 3, and the booster pump 4, and is transmitted to the reverse osmosis membrane 5. Then the reverse osmosis membrane 5 separates the water into purified water and concentrated water. The purified water is transmitted to the purified water outlet 8 via the rear processing unit 7.

As the emission control unit 9 is switched off, the concentrated water from the first water outlet 51 of the reverse osmosis membrane 5 flows through the waterflow control unit 6 and is mixed with raw water from the front processing unit 2 and the temperature sensing probe 3, and then the mixed water returns to the water inlet 41 of the booster pump 4, and enters the reverse osmosis membrane 5, and a circulation process is thus implemented.

As a preset time of producing purified water is up, the control circuit 11 transmits a concentrated water discharging signal to the emission control unit 9. At this time the emission control unit 9 is switched on and the concentrated water is emitted and washes the reverse osmosis membrane 5 at a high speed. As a preset emission time of the concentrated water is up, the emission control unit 9 is switched off, emission of the concentrated water is stopped, and a circulation process is thus implemented.

The control circuit 11 performs temperature compensation and correction for time of producing purified water of the reverse osmosis membrane 5, and the time of producing purified water is automatically decreased or increased with increase or decrease of the inlet water temperature.

In details, the temperature sensing probe 3 detects the inlet water temperature every one minute, and transmits a water temperature signal to the control circuit 11. The control circuit 11 calculates time of producing purified water according to the following formula:

$T1=T/[1-(25-C)\times 3\%]$, where T is a time of producing purified water at a standard temperature of 25° C., T1 is actual time of producing purified water as the water temperature varies, and C is a measured water temperature.

The invention implements a constant water utilization rate as water temperature changes.

A method for optimizing water purification profile, comprising providing an emission control device and a temperature sensing probe, controlling the emission control device to operate according to a standard emission time for purified water set at a water temperature of 25° C., obtaining an actual water temperature and performing temperature compensation thereof based on the water temperature of 25° C., and modifying an emission time of purified water based on a result of the temperature compensation and controlling the emission control unit to operate.

The step of modifying an emission time of purified water based on a result of the temperature compensation and controlling the emission control unit to operate comprises automatically reducing time of producing purified water if an inlet water temperature rises, and automatically increasing time of producing purified water if an inlet water temperature decreases.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for purifying waste water using a water purification apparatus, the water purification apparatus comprising: a reverse osmosis membrane module for separating the waste water into purified water and concentrated waste water, an emission control unit for controlling flow of the concentrated waste water, and a temperature sensing probe, the method comprising:

separating waste water into purified water and concentrated waste water using the reverse osmosis membrane module and discharging the purified water;

controlling said emission control unit to be switched off for a time interval T, whereby directing the concentrated waste water to flow back to the reverse osmosis membrane module;

controlling said emission control unit to be switched on for an emission time, whereby directing the concentrated waste water to flow through said emission control unit;

measuring a water temperature C of the waste water with the temperature sensing probe; and calculating a time interval T1 according to the formula $T1=T/[1-(25-C)\times 3\%]$ and controlling said emission control unit to be switched off for the time interval T1 whereby directing the concentrated waste water to flow back to the reverse osmosis membrane module.

2. A method for purifying waste water using a water purification apparatus, the water purification apparatus comprising: a booster pump (4) for increasing water pressure of waste water, the booster pump (4) having a first water inlet (41) and a first water outlet (42); a reverse osmosis membrane (5) for separating the waste water into purified water and concentrated waste water, the reverse osmosis membrane (5) having a second water outlet (51) and a third water outlet (52); a waterflow control unit (6) for controlling flow of the concentrated waste water from the second water outlet (51) to the first water inlet (41); an emission control unit (9) for controlling flow of the concentrated waste water; a fourth water outlet (10) for discharging the concentrated waste water; a control circuit (11) for controlling the emission control unit (9); and a fifth water outlet (8) for discharging the purified water; wherein: the reverse osmosis membrane (5) is connected to the first water outlet (42); the waterflow control unit (6) is connected between the second water outlet (51) and the first water inlet (41); the emission control unit (9) is connected between the second water outlet (51) and the fourth water outlet (10); and the fifth water outlet (8) is connected to the third water outlet (52); the method comprising:

a) setting a time interval T1 and an emission time within the control circuit (11);

b) during the time interval T1:
     i) increasing pressure of waste water using the booster pump (4), flowing the waste water at an increased pressure through the reverse osmosis membrane (5), whereby separating the waste water into purified water and concentrated waste water;
     ii) discharging the purified water through the fifth water outlet (8);
     iii) switching off the emission control unit (9), whereby directing the concentrated waste water to flow through the waterflow control unit (6) to the booster pump (4) to mix with the waste water, and
     iv) repeating steps i) through iii);

c) during the emission time: switching on the emission control unit (9), whereby directing the concentrated waste water to flow through the fourth water outlet (10) via the emission control unit (9) to wash the reverse osmosis membrane (5).

3. The method of claim 2, further comprising the step of controlling a flow speed of the waste water with a front processing unit (2), wherein the front processing unit (2) is connected to the first water inlet (41) via a pipe.

4. The method of claim 2, wherein in step c), the switching on of the emission control unit (9) is implemented by transmitting a signal from the control circuit (11) to the emission control unit (9).

5. The method of claim 2, further comprising the step of controlling the discharging of the purified water through the fifth water outlet (8) with a rear processing unit (7), wherein the rear processing unit (7) is connected between the third water outlet (52) and the fifth water outlet (8).

6. The method of claim 2, further comprising the following steps after step b) ii) and before step b) iii):

1) setting a time interval T within the control circuit (11);
   2) measuring a water temperature C of the water flowing from the first water inlet (41) with a temperature sensing probe (3);
   3) transmitting a signal from the temperature sensing probe (3) to the control circuit (11), the signal comprising the water temperature C; and
   4) calculating within the control circuit (11) the time interval T1 according to the formula $T1=T/[1-(25-C)\times 3\%]$.

7. The method of claim 6, wherein the steps 2) through 4) are performed every one minute.

\* \* \* \* \*